United States Patent [19]

McDonald

[11] 4,091,050

[45] May 23, 1978

[54] METHOD FOR THE PREPARATION OF MIXTURES OF (METH)ACRYLIC TERMINATED POLYETHER RESIN AND 3-HALO-2-HYDROXYPROPYL (METH)ACRYLATE

[75] Inventor: William H. McDonald, Arnold, Pa.

[73] Assignee: PPG Industries, Inc., Pittsburgh, Pa.

[21] Appl. No.: 652,686

[22] Filed: Jan. 27, 1976

[51] Int. Cl.$^2$ .............................................. C08L 63/00
[52] U.S. Cl. ................................ 260/837 R; 260/836; 204/159; 204/22; 204/159.16; 427/54; 427/44
[58] Field of Search ................................ 260/836, 837

[56] References Cited

U.S. PATENT DOCUMENTS

| | | | |
|---|---|---|---|
| 3,066,112 | 11/1962 | Bowen | 260/41 |
| 3,179,623 | 4/1965 | Bowen | 260/47 |
| 3,256,226 | 6/1966 | Fekete | 260/23.5 |
| 3,301,743 | 1/1967 | Fekete | 161/194 |
| 3,373,075 | 3/1968 | Fekete | 161/185 |
| 3,377,406 | 4/1968 | Hewey | 260/837 |
| 3,720,592 | 3/1973 | Mani | 204/159.15 |
| 3,772,062 | 11/1973 | Schur | 117/93.31 |
| 3,810,826 | 5/1974 | Mani | 204/159.15 |
| 3,816,283 | 6/1974 | Mani | 204/159.15 |
| 3,882,003 | 5/1975 | Mani | 204/159.16 |

FOREIGN PATENT DOCUMENTS

| | | |
|---|---|---|
| 1,450,996 | 7/1966 | France. |
| 1,592,554 | 5/1970 | France. |

OTHER PUBLICATIONS

Japan 70-39,244 Yoshida as cited from Chemical Abstracts vol. 74 Abstract No. 142,683B.

*Primary Examiner*—Paul Lieberman
*Attorney, Agent, or Firm*—George D. Morris; J. Timothy Keane

[57] ABSTRACT

Mixtures of (meth)acrylic terminated polyether resin and 3-halo-2-hydroxypropyl (meth)acrylate and/or 2-halo-1-(hydroxymethyl)ethyl (meth)acrylate are prepared by adding diglycidyl ether of bisphenol A to (meth)acrylic acid while the weight of 3-halo-2-hydroxypropyl (meth)acrylate and 2-halo-1-(hydroxymethyl)ethyl (meth)acrylate in the reaction mixture is at least about 5 percent by weight of the sum of the weights of the (meth)acrylic terminated polyether resin, the 3-halo-2-hydroxypropyl (meth)acrylate and the 2-halo-1-(hydroxymethyl) ethyl (meth)acrylate present in the reaction mixture. In a preferred embodiment, both epihalohydrin and diglycidyl ether of bisphenol A are added to the (meth)acrylic acid.

15 Claims, No Drawings

METHOD FOR THE PREPARATION OF MIXTURES OF (METH)ACRYLIC TERMINATED POLYETHER RESIN AND 3-HALO-2-HYDROXYPROPYL (METH)ACRYLATE

A resin represented by the formula:

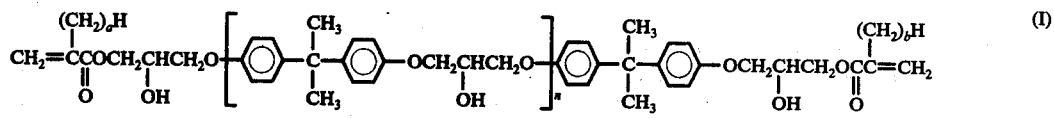

dissolved in a reactive solvent represented by the formula:

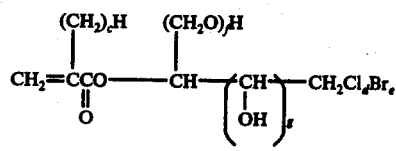

wherein
(a) the reactive solvent constitutes from about 5 percent to about 95 percent by weight of the mixture;
(b) the average value of $n$ is in the range of from 0 to 3;
(c) the average values of $a$, $b$ and $c$ are each independently in the range of from 0 to 1;
(d) the average value of $d$ is in the range of from 0 to 1;
(e) the average value of $e$ is in the range of from 0 to 1;
(f) $d + e = 1$;
(g) the average value of $f$ is in the range of from 0 to 1;
(h) the average value of $g$ is in the range of from 0 to 1; and
(i) $f + g = 1$ has been found to be particularly useful in the binder of radiation curable coating compositions.

The resin may be prepared by reacting the diglycidyl ether of bisphenol A with acrylic acid, methacrylic acid or mixtures of these acids. The preparation is described in British Pat. Specification No. 1,006,587. Several batches of resin may be blended together when desired.

Compounds constituting the reactive solvent may be prepared by reacting acrylic acid, methacrylic acid or mixtures of acrylic acid and methacrylic acid with epichlorohydrin, epibromohydrin or mixtures of epichlorohydrin and epibromohydrin. The reaction is usually conducted at an elevated temperature most often in the range of from about 50° C. to about 120° C. A stabilizer such as hydroquinone or 2,6-di-tert-butyl-4-methylphenol is usually present to inhibit free radical polymerization during the reaction. The reaction may be conducted with or without a solvent.

One manner of preparing the solution has been to admix the resin and the reactive solvent. However, separate preparation of these materials requires either two separate reactors or the tandem use of one reactor. Moreover, during preparation of the resin, the viscosity increases, often reaching high values. If agitation is inadequate, heating is localized in the viscous reaction mixture which often causes undesirable polymerization of the resin, viz., gelling. Also, if ethylenically unsaturated monocarboxylic acid is added to the diglycidyl ether of bisphenol A, there is a substantial tendency of the epoxy groups of the diglycidyl ether of bisphenol A to themselves polymerize to form higher molecular weight polyethers due to catalysis by the acid.

According to the present invention, in the preparation of a mixture of the resin and the reactive solvent, both being of the types hereinbefore described, wherein the reactive solvent constitutes from about 5 percent to about 90 percent by weight of the mixture and wherein diglycidyl ether of bisphenol A represented by the formula:

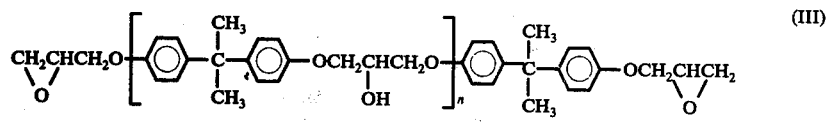

where the average value of $n$ is in the range of from 0 to 3, is reacted with ethylenically unsaturated monocarboxylic acid which is acrylic acid, methacrylic acid or mixtures of acrylic acid and methacrylic acid, the present improvement is adding the diglycidyl ether of bisphenol A to the ethylenically unsaturated monocarboxylic acid while the weight of reactive solvent in the reaction mixture is at least 5 percent of the sum of the weights of the resin and the reactive solvent present in the reaction mixture. The presence of at least 5 percent reactive solvent, based on the sum of the weights of reactive solvent and resin in the reaction mixture permits maintenance of the viscosity of the reaction mixture at acceptably low values during formation of the resin. Since the reactive solvent is a component of the binder of the ultimate product, viz., radiation curable coating composition, there is ordinarily no need to remove reactive solvent from the reaction mixture. Moreover, inasmuch as diglycidyl ether of bisphenol A is added to ethylenically unsaturated monocarboxylic acid, the concentration of epoxy groups is so low that reaction with the acid to form the desired resin predominates over the undesired side reaction.

It is preferred that both epihalohydrin and diglycidyl ether of bisphenol A are added to the ethylenically unsaturated monocarboxylic acid.

The product may be prepared according to any of several embodiments. According to one embodiment, a mixture of reactive solvent and ethylenically unsaturated monocarboxylic acid is formed by admixing 3-halo-2-hydroxypropyl acrylate and ethylenically unsaturated monocarboxylic acid. The reactive solvent may be added to the acid, the acid may be added to the solvent or they may both be added concurrently. Diglycidyl ether of bisphenol A is then added to the mixture of reactive solvent and acid to form the product.

According to another embodiment, a mixture of reactive solvent and ethylenically unsaturated monocarboxylic acid is formed by reacting epihalohydrin with ethylenically unsaturated monocarboxylic acid to form the reactive solvent. A mixture of reactive solvent and ethylenically unsaturated monocarboxylic acid is then formed to which is added diglycidyl ether of bisphenol A to form the product, as described in the first embodiment.

According to another embodiment, a mixture of reactive solvent and ethylenically unsaturated monocarboxylic acid is prepared by admixing epihalohydrin with an excess of ethylenically unsaturated monocarboxylic acid. The acid may be added to the epihalohydrin, the epihalohydrin may be added to the acid, or they may both be added concurrently. The product is then formed by adding diglycidyl ether of bisphenol A to the mixture.

According to another embodiment, diglycidyl ether of bisphenol A and epihalohydrin are concurrently added as separate streams to the ethylenically unsaturated monocarboxylic acid to produce the product.

According to the preferred embodiment, the product is prepared by adding a mixture of diglycidyl ether of bisphenol A and epihalohydrin to the ethylenically unsaturated monocarboxylic acid. The diglycidyl ether of bisphenol A is usually prepared by reacting bisphenol A, viz., 2,2-bis-(4-hydroxyphenyl)propane, with epihalohydrin, usually epichlorohydrin, using an excess of epihalohydrin in the process. The reaction mixture therefore comprises a mixture of the diglycidyl ether of bisphenol A and epihalohydrin. The diglycidyl ether of bisphenol A is usually purified by removing the epihalohydrin. Since the preferred embodiment of the present invention employs a mixture of the two components, removal of epihalohydrin from the reaction mixture can be eliminated or at least reduced, when diglycidyl ether of bisphenol A is prepared for use in the instant process. This results in a savings of time, equipment and capital.

In all of the embodiments, the diglycidyl ether of bisphenol A is added to ethylenically unsaturated monocarboxylic acid while the weight of reactive solvent in the reaction mixture is at least about 5 percent of the sum of the weights of the resin and reactive solvent present in the reaction mixture. The rate of addition is widely variable and depends upon such factors as reactor size, charge size, reaction temperature, available heating area, heating efficiency and mixing efficiency. The addition rate, however, should not be so great as to gel the contents of the reactor. It is preferred that the addition be gradual. The reaction may be carried out continuously, semicontinuously or batchwise. It is most often conducted batchwise.

The temperature at which the reaction is conducted may vary widely. Ordinarily, the temperature is in the range of from about 50° C. to about 130° C. More often, the temperature is in the range of from about 80° C. to about 120° C. A temperature in the range of from about 100° C. to about 115° C. is preferred.

The reaction is usually conducted at atmospheric pressure, although greater or lesser pressures may be employed, if desired.

The epihalohydrin employed is usually epichlorohydrin, epibromohydrin or mixtures of epichlorohydrin and epibromohydrin. The use of epichlorohydrin is preferred.

The values of $a$, $b$ and $c$ in the product may vary, depending upon whether acrylic acid, methacrylic acid or mixtures of acrylic acid and methacrylic acid are used in the process.

When the value of $a$ is zero, the $-(CH_2)_a H$ group is hydrogen. When the value of $a$ is one, the group is methyl. In an analogous manner, the similar groups containing $b$ and $c$ are either hydrogen or methyl, depending upon whether the values of $b$ and $c$ are zero or one. Although the values of $a$, $b$ and $c$ will each independently be either zero or one for any particular compound, the average values of these quantities for mixtures of compounds may be whole or fractional numbers in the range of from 0 to 1. The values of $a$, $b$ and $c$ may be determined analytically or, as is most often the case, by a knowledge of the structures of the starting materials used to prepare the compounds.

The values of $a$ and $b$ may be different for any particular compound, but it is preferred that they be the same. Often they are both one, but it is especially preferred that they both be zero in any particular compound. The resin may be a mixture of compounds wherein the average values of $a$ and $b$ are different, but it is preferred that the average values of $a$ and $b$ be the same. Usually, the average values of both $a$ and $b$ are zero or one. It is particularly preferred that the average values of both $a$ and $b$ be zero.

Similarly, the reactive solvent may be a mixture of compounds wherein the values of $c$ for the individual compounds constituting the mixture are different, but it is preferred that these values be the same, in which case the average value of $c$ for the mixture will be zero or one. It is particularly preferred that the average value of $c$ for the reactive solvent be zero.

The value of $n$ for any particular compound will be zero or a positive integer, while the average value of $n$ for a mixture of compounds constituting the resin may be a whole or fractional number. The value of $n$ for individual compounds may be 0, 1, 2, 3, 4 or even higher. Usually, the value of $n$ for individual compounds is 0, 1 or 2. When the average values of $a$ and $b$ are known, the average value of $n$ for the resin may be calculated from the number average molecular weight. The number average molecular weight may be found experimentally or calculated from the distribution of individual compounds, if this is known, using the equalities:

$$\overline{M}_n = \frac{\Sigma M_i N_i}{\Sigma N_i} = \frac{\Sigma w_i}{\Sigma m_i}$$

where
  $\overline{M}_n$ is the number average molecular weight;
  $M_i$ is the molecular weight of molecules of species $i$;
  $N_i$ is the number of molecules of species $i$;
  $w_i$ is the mass, expressed in grams, of molecules of species $i$; and
  $m_i$ is the mass, expressed in gram-moles, of molecules of species $i$.

The average value of $n$ for the resin is in the range of from 0 to 3. Typically, it is in the range of from 0 to about 2. More often, the average value of $n$ is in the range of from 0 to about 1.

The values of $d$ and $e$ in the product may vary, depending upon whether epichlorohydrin, epibromohydrin or mixtures of epichlorohydrin or epibromohydrin are used in preparing the reactive solvent. The values of $d$ and $e$ for any particular compound will be either 0 or 1. When the value of $d$ is one, the value of $e$ for the compound will be zero. Likewise, when the value of $d$ is zero, the value of $e$ for the compound will be unity. For mixtures of compounds, the average values of $d$ and $e$ may be whole or fractional numbers such that $d + e = 1$. Usually, the average value of $d$ for the mixture is either zero or one and the average value of $e$ is, respectively, either one or zero. It is preferred that the average value of $d$ for the mixture be one and the average value of $e$ be zero. The epihalohydrin, whether epichlorohydrin, epibromohydrin or mixtures of epichlorohydrin and epibromohydrin, used in preparing the reactive solvent may be represented by the formula:

(IV)

where the values of $d$ and $e$ are as discussed above. Usually, the average values of $d$ and $e$ for the epihalohydrin are the same or substantially the same as those for the reactive solvent.

The values for $f$ and $g$ for any particular compound will be either 0 or 1. When the value of $f$ is one, the value of $g$ for the compound will be zero. Likewise, when the value of $f$ is zero, the value of $g$ for the compound will be one. For mixtures of compounds, the average values of $f$ and $g$ may be whole or fractional numbers such that $f + g = 1$. When the reactive solvent is prepared by reacting epihalohydrin with acrylic acid and/or methacrylic acid, the values of $f$ and $g$ for a compound will be determined by which bond of the epoxide group is attacked during the reaction. The average values of $f$ and $g$ for the mixture of compounds resulting from the reaction will be determined by the distribution of the epoxide bonds attacked. Usually the average value of $g$ for such mixtures is greater than the average value of $f$. For most purposes, it is not necessary to analyze mixtures of these compounds for the average values of $f$ and $g$, it being satisfactory to utilize the mixture as formed by the reaction. Nevertheless, it is permissible, and sometimes desirable, to modify the average values of $f$ and $g$ by adding appropriate amounts of specific compounds having structures within generic Formula II. Similarly, mixtures of compounds having appropriate values of $c$, $d$, $e$, $f$ and $g$ may be formed by admixing compounds having the structures within generic Formula II.

From a consideration of the permissible values of $c$, $d$, $e$, $f$ and $g$, compound species within generic Formula II are:

3-chloro-2-hydroxypropyl acrylate
3-chloro-2-hydroxypropyl methacrylate
3-bromo-2-hydroxypropyl acrylate
3-bromo-2-hydroxypropyl methacrylate
2-chloro-1-(hydroxymethyl)ethyl acrylate
2-chloro-1-(hydroxymethyl)ethyl methacrylate
2-bromo-1-(hydroxymethyl)ethyl acrylate
2-bromo-1-(hydroxymethyl)ethyl methacrylate The reactive solvent may comprise only one of these compounds or it may comprise mixtures of more than one. The preferred compounds are 3-chloro-2-hydroxypropyl acrylate and 3-bromo-2-hydroxypropyl acrylate. The former is especially preferred.

The proportions of resin and reactive solvent present in radiation curable coating compositions may vary widely. Usually, the amount of resin present is in the range of from about 5 percent to about 95 percent by weight of the binder. More often, it is in the range of from about 10 percent to about 80 percent by weight of the binder. An amount in the range of from about 15 to about 70 percent is preferred. The amount of reactive solvent present is usually in the range of from about 5 to about 95 percent by weight of the binder. An amount in the range of from about 20 percent to about 90 percent is typical. An amount in the range of from about 30 to about 85 percent by weight of the binder is preferred. Because the reactive solvent eventually becomes an integral part of the cured coating, it is considered to be a part of the binder.

The radiation curable coating composition may consist of substantially only the resin dissolved in the reactive solvent, but other materials are often also present.

When the coating composition is to be cured by exposure to ultraviolet light photoinitiator, photosensitizer or a mixture of photoinitiator and photosensitizer is usually present.

Photoinitiators are compounds which absorb photons and thereby obtain energy to form radical pairs, at least one of which is available to initiate addition polymerization of acrylic or methacrylic groups in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, $\alpha,\alpha$-diethoxyacetophenone and $\alpha$-chloroacetophenone. Examples of photosensitizers are benzil, 1-naphthaldehyde, anthraquinone, benzophenone, 3-methoxybenzophenone, benzaldehyde and anthrone.

The amount of photoinitiator, photosensitizer or mixture of photoinitiator and photosensitizer present in the radiation curable coating composition can vary widely. When any of these materials are present, the amount is usually in the range of from about 0.01 to about 10 percent by weight of the binder of the coating composition. Most often, the amount is in the range of from about 0.1 to about 5 percent by weight of the binder. When the coating is to be cured by exposure to ionizing radiation, these materials are usually omitted from the coating composition, although their presence is permissible.

Extender pigments are often present in the radiation curable coating composition, particularly when the coating composition is used as a filler for wood or composition board such as particle board, hardboard of the Masonite type, flake board and chip board. The extender pigment gives the coating composition a paste-like consistency and, upon curing, provides an easily sandable surface. When ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates. When used, extender pigment is usually present in an amount in the range of from about 5 percent to about 85 percent by weight of the radiation curable coating composition. Ordinarily, the amount is in the range of from about 10 percent to about 75 percent by weight of the coating composition. An amount in the range of from about 30 percent to about 70 percent by weight is preferred. Mixtures of extender pigments as well as individual extender pigments may be employed.

Hiding and/or coloring pigment may optionally be present. When the pigment is of the ultraviolet light absorbing type and the coating composition is to be cured by exposure to ultraviolet light, the pigment should be used in amounts which do not preclude curing of the interior of the coating. The maximum amount is therefore related to the thickness of the coating to be cured. Thin coatings may tolerate more ultraviolet light absorbing pigment than thick coatings. Since ionizing radiation is much more penetrating than ultraviolet light, there is usually no significant problem with absorption of radiation by the pigment. When used, hiding and/or coloring pigment is usually present in an amount in the range of from about 0.1 percent to about 60 percent by weight of the coating composition. For thicker coatings, an amount in the range of from about 0.5 percent to about 50 percent is usually satisfactory. Examples of ultraviolet light absorbing hiding pigments are titanium dioxide, antimony oxide, zirconium oxide, zinc sulfide and lithopone. Examples of coloring pigment are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed.

Dyes in their customarily used amounts may be present in the coating composition.

Although not ordinarily desired, minor amounts, usually in the range of from about 0.1 to about 20 percent by weight of the vehicle, of volatile reactive solvent and/or inert volatile organic solvent may be present in the radiation curable coating composition.

Other relatively nonvolatile reactive solvents such as vinyl pyrrolidone may also be present. When used, they are generally present in an amount in the range of from about 0.1 percent to about 50 percent by weight of the binder. An amount in the range of from about 5 percent to about 25 percent by weight of the binder is typical.

Another optional ingredient is thermoplastic resin. When present, these are usually present in an amount in the range of from about 0.1 percent to about 50 percent by weight of the binder of the radiation curable coating composition. Typically, the amount is in the range of from about 1 percent to about 25 percent by weight of the binder. Examples of thermoplastic resins which may be used are cellulose acetate, cellulose acetate butyrate, poly(vinyl chloride), copolymers of vinyl chloride and vinyl acetate, saturated polyesters, homopolymers and interpolymers of methyl methacrylate, methyl acrylate, ethyl acrylate, ethyl methacrylate, butyl acrylate, butyl methacrylate, 2-ethylhexyl acrylate, styrene and vinyl toluene. Individual thermoplastic resins or mixtures of such resins are useful. Brittle, friable thermoplastic resins are preferred in coating compositions used for filling wood. Examples are rosin, resins derived from rosin, chlorinated paraffins, chlorinated rubber, petroleum hydrocarbon resins and hard gums.

Various additional materials may be added to adjust the viscosity of the coating composition. Examples of such materials are fumed silica, castor oil based compositions (e.g., Thixatrol ST, Baker Castor Oil Company) modified clays, 12-hydroxystearic acid, tetrabutyl orthotitanate and microcrystalline cellulose. When used, these materials are usually present in an amount in the range of from about 0.5 percent to about 15 percent by weight of the binder.

The radiation curable coating compositions are usually prepared by simply admixing the solution of resin dissolved in reactive solvent with such other ingredients as may be present. Although mixing is usually accomplished at room temperature, elevated temperatures are sometimes used. The maximum temperature which is usable depends upon the heat stability of the ingredients. Temperatures above about 120° C. are only rarely employed.

The radiation curable coating compositions are used to form cured adherent coatings on substrates. The substrate is coated with the coating composition using substantially any technique known to the art. These include spraying, curtain coating, dipping, direct roll coating, reverse roll coating, painting, brushing, printing, drawing and extrusion. The coated substrate is then exposed to radiation of sufficient intensity for a time sufficient to crosslink the coating. The times of exposure to radiation and the intensity of the radiation to which the coating composition is exposed may vary greatly. Generally, the exposure to radiation should continue until the C-stage is reached when hard, solvent resistant films result. In certain applications, however, it may be desirable for the curing to continue only until the B-stage, viz., gel stage, has been obtained.

Substrates which may be coated with the radiation coating compositions may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chronium, zinc and alloys.

Cured coatings of the radiation curable coating composition usually have thicknesses in the range of from about 0.001 millimeter to about 3 millimeters. More often, they have thicknesses in the range of from about 0.007 millimeter to about 0.3 millimeter. When the radiation curable coating composition is a radiation curable printing ink, the cured coatings usually have thicknesses in the range of from about 0.001 millimeter to about 0.03 millimeter.

The radiation curable coatings may be cured by exposure to ionizing radiation. Ionizing radiation is radiation possessing an energy at least sufficient to produce ions either directly or indirectly in a medium composed of common elements such as air or water and includes ionizing particle radiation and ionizing electromagnetic radiation. Ionizing particle radiation designates the emission of electrons or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cyctotrons, etc. Neutron radiation can be produced by bombarding a selected light metal such as beryllium with positive particles of high energy. Ionizing particle radiation can also be obtained by the use of an atomic pile, radioactive isotopes or other natural or synthetic radioactive materials. Ionizing electromagnetic radiation comprises high energy photons. Examples are X-rays, bremsstrahlung and gamma rays.

X-rays may be produced when a metallic target such as tungsten, copper or molybdenum is bombarded with electrons of suitable energy. This energy is conferred to the electrons by accelerators, usually, but not necessarily, of the linear type. Travelling wave linear accelerators, standing wave linear accelerators and DC potential gradient linear accelerators are ordinarily employed for this purpose.

Bremsstrahlung, also known as continuous X-rays, is produced by the deceleration of electrons. The continuum extends from a short-wave limit dependent upon the maximum energy of the electrons indefinitely toward the long wavelength end of the spectrum.

Gamma rays may be obtained by means of a nuclear reactor, such as a pile, by the use of natural or synthetic radioactive materials such as cobalt 60 or radium which emit gamma rays, or by absorption of a neutron in the $(n,\gamma)$ reaction.

The ionizing radiation, whether particle radiation or electromagnetic radiation, ordinarily has an energy of at least about 10 electron volts. While there is no upper limit to the energy of ionizing radiation which can be used advantageously, the effects desired in the practice of this invention can be accomplished without resorting to the use of ionizing radiation having energies above about 20,000,000 electron volts.

Accelerated electrons is the preferred ionizing radiation for crosslinking coatings of the radiation curable coating composition of the invention. Bremsstrahlung generated by the deceleration of the electrons is also present and probably contributes to crosslinking. Various types of linear electron accelerators are known, for example, the ARCO type travelling wave accelerator, model Mark I, operating at 3 to 10 million electron volts supplied by High Voltage Engineering Corporation, Burlington, Mass., or other types of accelerators such as are described in U.S. Pat. No. 2,763,609 and British Patent Specification No. 762,953 are satisfactory. Usually, the electrons are accelerated to energies in the range of from about 10,000 electron volts to about 1,000,000 electron volts. Typically, the energy is in the range of from about 20,000 electron volts to about 500,000 electron volts. Preferably, the energy is in the range of from about 25,000 electron volts to about 200,000 electron volts.

The unit of dose of ionizing radiation is the "rad" which is equal to 100 ergs of energy absorbed from ionizing radiation per gram of material being irradiated. Dose is initially determined using an absolute method such as calorimetry or ionization dosimetry. These absolute methods are quite sophisticated and hence are not generally practical for routine determinations. Once a radiation field has been explored by an absolute method of dosimetry, it is possible to calibrate secondary radiation indicators in that field using relative dosimetry techniques. One simple method of relative dosimetry is based upon the bleaching of blue cellophane by ionizing radiation. The blue cellophane is exposed to a standard source for a known time and the transmittance is measured with a spectrophotometer at 655 nanometers. The transmittance of unexposed cellophane is also measured and the percent change in transmittance due to exposure to ionizing radiation is calculated. From several such readings and calculations, a graph may be constructed relating change in transmittance with dose. A blue cellophane manufactured by the E. I. duPont DeNemours & Company has been used for this purpose. The calibrated blue cellophane may then be used to calibrate other sources of the same kind of radiation and other kinds of blue cellophane which may be used in routine work. Avisco cellophane 195 CMS light blue manufactured by the American Viscose Division of FMC Corporation has been calibrated and used for routine dose determinations. In practice, the calibrated blue cellophane is exposed to the ionizing radiation before, after or simultaneously with the coated substrate being irradiated. The dose received by the coating is considered to be the same as that received by the blue cellophane. This presumes that the absorption of energy by the coating is the same as that of the blue cellophane. Except for materials containing rather large proportions of atoms of very high atomic weight, the absorption of ionizing radiation is nearly independent of the identity of the material. The presumption is, therefore, valid for the ordinary work of coatings manufacturing where very high degrees of accuracy of dose measurement are not needed. As used throughout the specification, dose is referenced to the bleaching of calibrated blue cellophane film irrespective of the identity of the coating composition being irradiated.

Coatings of the radiation curable coating compositions described herein are ordinarily exposed to ionizing radiation in an amount in the range of from about 0.01 megarad to about 20 megarads, although doses greater than 20 megarads may be used satisfactorily. The dose, however, should not be so great that the chemical or physical properties of the coating are seriously impaired. Typically, the dose is in the range of from about 0.1 megarad to about 20 megarads. The preferred dose is in the range of from about 1 megarad to about 10 megarads.

The coatings may also be cured by exposure to actinic light. Actinic light, as used herein, is electromagnetic radiation having a wavelength of 700 nanometers or less which is capable of producing, either directly or indirectly, free radicals capable of initiating addition polymerization of the coating compositions. Usually, photoinitiator, photosensitizer or mixtures of photoinitiator and photosensitizer are present to absorb photons and produce the free radicals, although, in some cases, these materials are not needed. Actinic light possesses insufficient energy to produce ions in a medium composed of common elements such as air or water and hence, has an energy below about 10 electron volts. The most commonly used form of actinic light is ultraviolet light, viz., electromagnetic radiation having a wavelength in the range of from about 180 nanometers to about 460 nanometers, although actinic light of greater or shorter wavelength may also be used effectively.

Any suitable source which emits ultraviolet light may be used in curing coatings of the radiation curable composition. Suitable sources are mercury arcs, carbon arcs, low pressure mercury lamps, medium pressure mercury lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2032, 60-0393, 60-0197 and 60-2031 and Hanovia Models 6512A431, 6542A431, 6565A431 and 6577A431. Similarly, any suitable source producing actinic light having greater or shorter wavelengths than ultraviolet light may be used. Many types of such sources are well known.

The times of exposure to actinic light and the intensity of actinic light to which the coating composition is exposed may vary greatly. In keeping with the general principles heretofore set forth, the exposure to actinic light should usually continue until the C-stage is obtained. However, for certain applications, the exposure may be stopped when the B-stage has been achieved.

In the illustrative examples which follow, all parts are parts by weight and all percentages are percentages by weight unless otherwise specified.

EXAMPLE I

A reactor equipped with a thermometer, a heater, a cooler, an agitator, a condenser set for total reflux, a source of air and a source of nitrogen is charged with 1672 parts acrylic acid, 9.3 parts 2,6-di-tertbutyl-4-methylphenol and 9.3 parts triphenyl phosphine, an air sparge and a nitrogen sparge are applied. The charge is then heated to 104° C. Over a period of 3½ hours, 2395 parts of a mixture comprising 1675 parts epichlorohydrin and 720 parts bisphenol A-diglycidyl ether (Epon 828; Shell Chemical Co.) is added to the reactor while maintaining the temperature of the reaction mixture in the range of from 104° C. to 106° C. Upon completion of the addition, the temperature of the reaction mixture is held in the range of from 106° C. to 118° C. for 6½ hours. At the end of this period, (temperature: 117.2° C.), 20.5 parts bis(β-hydroxyethyl)sulfide is added to the reaction mixture, heat is shut off and cooling is applied. Seventy-five minutes later when the temperature has reached 49° C., the product is discharged through a filter into containers. The product, which is a mixture of 3-chloro-2-hydroxypropyl acrylate, 2-chloro-1-(hydroxymethyl)ethyl acrylate, the diacrylate of Epon 828 bisphenol A-diglycidyl ether and bis(β-hydroxyethyl)sulfide is found to have an acid number of 5.0, a viscosity of 298 centipoises, a hydroxyl number of 250 and to contain 0.01 percent water and 15.6 percent chlorine. The diacrylate of Epon 828 bisphenol A-diglycidyl ether may be depicted as having the structural formula:

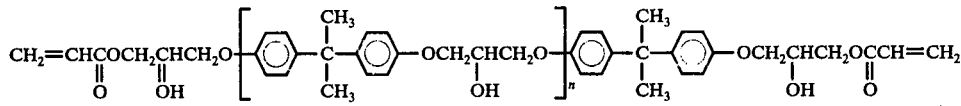

where the value of $n$ is in the range of from 0 to about 1.

EXAMPLE II

A reactor equipped with a thermometer, a heater, a cooler, an agitator, a condenser set for total reflux, a source of air and a source of nitrogen is charged with 380.8 parts acrylic acid, 1.87 parts 2,6-di-tert-butyl-4-methylphenol and 1.86 parts triphenyl phosphine and an air sparge is applied. The charge is then heated to 110° C. A mixture comprising 385 parts epichlorohydrin and 166.6 parts Epon 828 bisphenol A-diglycidyl ether is preheated to about 110° C. Over a period of 4 hours, 551.6 parts of the preheated mixture is added to the reactor while maintaining the temperature of the reaction mixture in the range of from 110° C. to 111.7° C. Upon completion of the addition, the temperature of the reaction mixture is held in the range of from 110° C. to 113° C. for 75 minutes. At the end of this period (temperature: 112.2° C.), heat is shut off and cooling is applied. Fifteen minutes later (temperature: 96.1° C.), the condenser is set for distillation, a slight vacuum of 1.2 × 10⁵ dynes per square centimeter is applied while maintaining an air sparge and distillation is begun. Two hours later (temperature: 97.8° C.), 21 parts distillate has been removed and the vacuum is removed. Thirty minutes later (temperature: 97.2° C.), a slight vacuum of 1.07 × 10⁵ dynes per square centimeter is applied while maintaining an air sparge and distillation is again begun. Two hours later (temperature: 97.2° C.), 7 additional parts distillate has been removed and the vacuum and air sparge are removed. Fifteen minutes later (temperature: 97.8° C.), the vacuum and air sparge are reapplied. Thirty minutes later (temperature: 97.8° C.), the vacuum and air sparge are removed, heat is shut off and cooling is applied. Forty-five minutes later when the temperature has reached 54.4° C., the product is discharged through a filter into containers. The product, which is a mixture of 3-chloro-2-hydroxypropyl acrylate, 2-chloro-1-(hydroxymethyl)ethyl acrylate and the diacrylate of Epon 828 bisphenol A-diglycidyl ether, is found to have an acid number of 3.9, a Gardner-Holdt viscosity of k, a hydroxyl number of 242 and to contain 0.02 percent water and 14.1 percent chlorine.

EXAMPLE III

A reactor equipped with a thermometer, a heater, an agitator and a condenser set for total reflux is charged with 1569 parts acrylic acid, 8 parts triphenyl phosphine and 12 parts 2,6-di-tert-butyl-4-methylphenol. The charge is then heated to 102° C. Over a period of 4 hours, 873.6 parts Epon 828 bisphenol A-diglycidyl ether and 1574 parts epichlorohydrin are concurrently added as separate streams while maintaining the temperature of the reaction mixture in the range of from 102° C. to 110° C. Upon completion of the addition, the reaction mixture is held in the range of from 110° C. to 118° C. for 4¼ hours. At the end of this period (temperature: 117° C.), heat is shut off and the reaction mixture is allowed to cool overnight to room temperature. The product is then heated to 60° C. and filtered into a container. The product, which is a mixture of 3-chloro-2-hydroxypropyl acrylate, 2-chloro-1-(hydroxymethyl)ethyl acrylate and the diacrylate of Epon 828 bisphenol A-diglycidyl ether is found to have an acid number of 3.73, a Gardner-Holdt viscosity of L-M, a Gardner Color of 1, a hydroxyl number of 273 and to contain 0.021 percent water, 14.5 percent chlorine and less than 0.10 percent free epichlorohydrin.

EXAMPLE IV

A reactor equipped with a thermometer, a heater, an agitator and a condenser set for total reflux is charged with 1663 parts acrylic acid, 4 parts 2,6-di-tert-butyl-4-methylphenol and 6 parts triphenyl phosphine. The charge is then heated to 101° C. Over a period of 3 hours, 2417 parts of a mixture comprising 1687 parts epichlorohydrin and 730 parts Epon 828 bisphenol A- diglycidyl ether is added to the reactor while maintaining the temperature of the reaction mixture in the range of from 101° C. to 108° C. Upon completion of the addition, the reaction mixture is held in the range of from 100° C. to 118° C. for 9½ hours. At the end of this period (temperature: 110° C.), heat is shut off and the reaction mixture is allowed to cool overnight to room temperature. The product is then heated to 60° C. and filtered into a container. The product, which is a mixture of 3-chloro-2-hydroxypropyl acrylate, 2-chloro-1-(hydroxymethyl) ethyl acrylate and the diacrylate of Epon 828 bisphenol A-diglycidyl ether, is found to have an acid number of 2.76, a Gardner-Holdt viscosity of L-M, a Gardner Color of 1, hydroxyl number of 240.5 and to contain 0.09 percent water, 14.6 percent chlorine and less than 0.015 percent free epichlorohydrin.

EXAMPLE V

An intermediate composition is prepared by admixing 900 parts of the product of Example II and 100 parts bis(β-hydroxyethyl)sulfide.

A first filler composition is prepared by admixing 200 parts of the above intermediate, 0.7 part antisettling agent (Anti Terra U; Byk-Mallinkrodt), 19.7 parts Montana platy talc having a mean particle size of less than 2 micrometers (Mistron Vapor; United Sierra Division of Cypress Mines Corp.), 98 parts aluminum silicate clay, 98 parts amorphous silica (Imsil A-25; Illinois Minerals), 49 parts ground marble and 4.1 parts isobutyl benzoin ether. The viscosity of the first filler composition is determined to be 22,000 centipoises by a Brookfield viscometer using a number 7 spindle at 100 revolutions per minute.

The first filler composition is drawn down on glass substrates using a number 0.0015 Bird applicator. The coated substrates are passed once, in air, through an ultraviolet light processor containing four medium pressure mercury vapor lamps which are emitting ultraviolet light. The lamps are 8.89 centimeters above the plane of the substrate surface.

Following exposure to the ultraviolet light, adhesion of the cured coating to the substrates is tested by the crosshatch test. In this test, a first series of parallel lines and a second series of parallel lines which are perpendicular to the lines of the first series are scribed through the coating to the substrate so as to form a checkerboard pattern of squares, each square being about 3.175 millimeters on a side. Three times No. 600 Scotch brand adhesive tape (3M Corp.) is applied to the scribed area and pulled off suddenly. The percent of the taped crosshatched area from which coating has been removed is then determined. A loss in the range of 0 percent to 5 percent is given a rating of good. A loss in the range of from above 5 percent to 30 percent is given a rating of fair. A loss above 30 percent is given a rating of poor.

Sanding characteristics of the cured coating on the substrates are tested by the sanding test. In this test, the coating is sanded with number 350 grit sandpaper using 10 back and forth rubs. The sandpaper is then flicked or brushed against a cloth. The percent of the powder retained in the sandpaper is then determined. A low degree of retention in the sandpaper is desirable.

The speeds of passage under the ultraviolet light emitting lamps and the results of the testing are shown in Table 1.

Table 1

| Speed of Travel Through Ultraviolet Light Processor | | Crosshatch Adhesion, | Percent Powder Retained on |
|---|---|---|---|
| feet/minute | meters/minute | percent removed | Sandpaper |
| 60 | 18.3 | 1 | 0 |
| 80 | 24.4 | 2 | 0 |

A second filler composition is prepared by admixing 200 parts of the product of Example II, 0.7 part Anti Terra U antisettling agent, 19.7 parts Mistron Vapor Montana platy talc, 98 parts aluminum silicate clay, 98 parts Imsil A-25 amorphous silica, 49 parts ground marble and 4.1 parts isobutyl benzoin ether. The viscosity of the second filler composition is determined to be 30,000 centipoises by a Brookfield viscometer using a number 7 spindle at 100 revolutions per minute.

The second filler composition is drawn down on glass substrates using a number 0.0015 Bird applicator. The coated substrates are passed once, in air, through the four lamp ultraviolet light processor described above. The cured coated substrates are then subjected to the crosshatch and sanding tests heretofore described. The speeds of passage under the ultraviolet light emitting lamps and the results of the testing are shown in Table 2.

Table 2

| Speed of Travel Through Ultraviolet Light Processor | | Crosshatch Adhesion, | Percent Powder Retained on |
|---|---|---|---|
| feet/minute | meters/minute | percent removed | Sandpaper |
| 60 | 18.3 | 0 | 0 |
| 80 | 24.4 | 1 | 0 |

EXAMPLE VI

An intermediate composition is prepared by admixing 775 parts of the product of Example II, 159 parts of the triacrylate of pentaerithritol, 46 parts epoxidized linseed oil (Paraplex G-62; Rohm & Haas Co.) and 20 parts resinous silicone flow additive (Byk-300; Byk-Mallinkrodt Co.).

A first base white composition is prepared by grinding 500 parts titanium dioxide pigment in 350 parts of the above intermediate composition to a Hegman 7 grind and then thinning with 150 parts of the above intermediate composition.

A first white coating composition is prepared by admixing 80 parts of the above first base white composition, 8 parts methyl ethyl ketone, 0.8 part methylanthraquinone and 0.8 part isobutyl benzoin ether. The viscosity of the first white coating composition is determined to be 1280 centipoises by a Brookfield viscometer using a number 5 spindle at 50 revolutions per minute and 840 centipoises using a number 5 spindle at 100 revolutions per minute.

The first white coating composition is drawn down on aluminum substrates using a number 006 wire wound drawbar. Separate coated substrates are passed through the four lamp ultraviolet light processor of Example V at speeds of 15.2, 30.5, 45.7 and 61.0 meters per minute, respectively. Another coated substrate is passed at a speed of 61.0 meters per minute through the ultraviolet light processor which has only three lamps in operation. The coatings of all coated substrates passed through the ultraviolet light processor having four lamps operating were dry and resistant to finger rubbing, but were able to be removed by tape without previous crosshatching.

Tape-off with previous crosshatching is eliminated for these coated substrates by post baking for 2 minutes at 204.4° C. in a circulating air oven.

A second white coating composition is prepared by admixing 50 parts of the above first base white composition, 5.8 parts methyl ethyl ketone, 0.7 part methylanthraquinone, 0.7 part isobutyl benzoin ether and 8 parts of the above intermediate composition. The viscosity of the second white coating composition is determined to be 640 centipoises by a Brookfield viscometer using a number 5 spindle at 100 revolutions per minute.

The second white coating composition is drawn down on aluminum substrates using a number 006 wire wound drawbar. Separate coated substrates are passed through the ultraviolet light processor in the same manner as that described above for the first white coating composition to obtain substantially the same results. Better hiding is provided by the first white coating composition than the second white coating composition.

A second base white composition is prepared by grinding 415 parts titanium dioxide pigment in 400 parts of the above intermediate composition to a Hegman 7 grind and then thinning with 155 parts of the above intermediate composition.

A third white coating composition is prepared by admixing 50 parts of the above second base white composition, 5 parts methyl ethyl ketone, 0.6 part methylanthraquinone and 0.6 part isobutyl benzoin ether. The viscosity of the third white coating composition is determined to be 200 centipoises by a Brookfield viscometer using a number 5 spindle at 100 revolutions per minute and 220 centipoises using a number 4 spindle at 100 revolutions per minute.

The third white coating composition is drawn down on aluminum substrates using a number 006 wire wound drawbar. Separate coated substrates are passed through the ultraviolet light processor in the same manner as that described above for the first white coating composition to obtain substantially the same degree of hiding as obtained by the first white coating composition. The cured coating is tested for adhesion.

A fourth white coating composition is prepared by admixing 70 parts of the above second base white composition, 7 parts methyl ethyl ketone, 1.6 parts methyl phenylglyoxylate, 0.8 part isobutyl benzoin ether and 0.21 part methylanthraquinone. The viscosity of the fourth white coating composition is determined to be 180 centipoises by a Brookfield viscometer using a number 4 spindle at 100 revolutions per minute.

The fourth white coating composition is drawn down on an aluminum substrate and passed once, in air, through the four lamp ultraviolet light processor of Example V at a speed of 61.0 meters per minute to produce a hard, infusible coating showing good hiding. The cured coating is tested for adhesion.

Of the four white coating compositions, the fourth white coating composition provides the best adhesion and the third white coating composition provides the next best adhesion.

EXAMPLE VII

A solution is prepared by dissolving 573 parts adhesion promoting resin (22D-54; Rohm & Haas Co.) in 397 parts hot methyl ethyl ketone.

A first intermediate composition is prepared by admixing 970 parts of the above solution, 1795 parts of the product of Example II, 1108 parts of the triacrylate of pentaerithritol and 27 parts Paraplex G-62 epoxidized linseed oil.

A second intermediate is prepared by grinding 1530 parts of the above first intermediate, 2370 parts titanium dioxide, 29 parts methylanthraquinone, 38 parts spermaceti wax and 95 parts Byk-300 resinous silicone flow additive with a Cowles blade to a Hegman 7 grind.

A coating composition is prepared by admixing 4062 parts of the above second intermediate, 1100 parts of the above first intermediate, 283 parts 3-acrylyloxy-2,2-dimethylpropyl 3-acrylyloxy-2,2-dimethylpropionate, 189 parts of a urea-formaldehyde resin composition (Uformite F-240; Rohm & Haas Co.) having 60 percent solids (solvents are xylol-butanol 1:1.5), 283 parts 1-acrylyloxy-2-hydroxy-3-butoxypropane (prepared by reacting one molar part acrylic acid with one molar part 1,2-epoxy-3-butoxypropane), 95 parts methyl phenylglyoxylate, 62 parts isobutyl benzoin ether and 283 parts methyl ethyl ketone.

The coating composition is drawn down on an aluminum substrate using a number 009 wire wound drawbar. The coated substrate is passed once, in air, at a speed of 61.0 meters per minute through the four lamp ultraviolet light processor of Example V to produce a hard, infusible coating. When subjected to the crosshatch test of Example V, much of the coating is removed by the tape. After post baking for 2 minutes at 204.4° C. in a circulating air oven, a crosshatch rating of good is achieved. Submersion in buffered borax solution at 71.1° C. for 30 minutes similarly yields a crosshatch rating of good.

EXAMPLE VIII

A reactor equipped with a thermometer, a heater, a cooler, an agitator, a condenser set for total reflux, a source of air and a source of nitrogen is charged with 1156 parts acrylic acid, 0.44 part methyl hydroquinone, 6.1 parts 2,6-di-tert-butyl-4-methylphenol, 21.1 parts 2-[2-[4-(1,1,3,3-tetramethylbutyl)-3-methylphenoxy]ethoxy] ethyl dimethyl benzyl ammonium chloride monohydrate and 205 parts toluene and a slight air sparge is applied. The charge is then heated to 107° C. Over a period of 3½ hours, 2915 parts Epon 828 bisphenol A-diglycidyl ether which has been preheated to a temperature in the range of from 51.6° C. to 54.6° C. is added to the reactor while maintaining the temperature of the reaction mixture in the range of from 107° C. to 109° C. Upon completion of the addition, the temperature of the reaction mixture is held in the range of from 107° C. to 110° C. for 3¾ hours. At the end of this period, the condenser is set for total distillation, viz., no condensate is returned to the reactor, and both air and nitrogen sparges are applied. The reaction mixture is held at a temperature in the range of from 108° C. to 113° C. for 5 hours and distillate is removed. At the conclusion of this period, heat is shut off, cooling is applied and a slight air sparge is maintained. One hour later when the temperature has reached 90.6° C., the product is discharged from the reactor through a nylon bag filter into containers. The product, which is the diacrylate of Epon 828 bisphenol A-diglycidyl ether, is found to have an acid number of 0.5, a hydroxyl number of 214 and to contain 0.01 percent water and 0.2 percent toluene. A 75 percent solution of the product is ethyl cellosolve has a Gardner-Holdt viscosity of T-U.

A coating composition is prepared by admixing 23.72 parts of the product of Example I, 5.49 parts of the diacrylate of Epon 828 bisphenol A-diglycidyl ether, 0.21 part 1-acrylyloxy-2-hydroxy-3-butoxypropane, 0.77 part Byk-300 resinous silicone flow additive, 0.88 part diethoxyacetophenone and 0.88 part ethyl phenylglyoxylate.

The coating composition is applied to various substrates at a rate of 0.387 milligram per square centimeter using a hand-operated direct roll coater. The substrates used are of aluminum, of tin-free steel and of tin-free steel coated with a white coating composition which has been cured. The coated substrates are passed once, in air, at a speed of 57.9 meters per minute through the four lamp ultraviolet light processor of Example V having only three lamps operating to produce cured coatings having, on the average, substantially no tack when pressed with a thumb, substantially no mar when scratched with a fingernail and a rating of fair when tested by the crosshatch test of Example V. After post baking for 3 minutes at 204.4° C. in a circulating air oven, an average crosshatch rating of good is obtained.

EXAMPLE IX

A reactive solvent is prepared by admixing 100 parts 3-chloro-2-hydroxypropyl acrylate, 50 parts 3-chloro-2-hydroxypropyl methacrylate, 25 parts 3-bromo-2-hydroxypropyl acrylate, 15 parts 2-chloro-1-(hydroxymethyl)ethyl acrylate and 10 parts 2-bromo-1-(hydroxymethyl)ethyl methacrylate. The reactive solvent is represented by the formula:

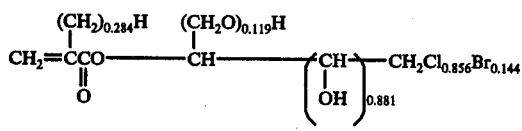

I claim:

1. In the method of preparing a mixture of a resin represented by the formula:

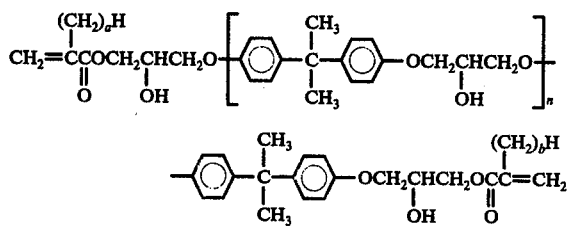

and a reactive solvent represented by the formula:

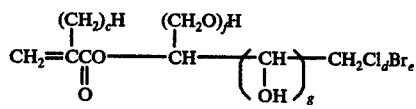

wherein
(a) said reactive solvent constitutes from about 5 percent to about 95 percent by weight of said mixture;
(b) diglycidyl ether of bisphenol A represented by the formula:

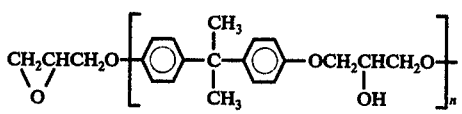

-continued

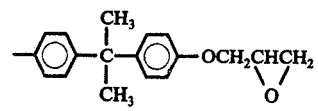

and epihalohydrin represented by the formula:

are reacted with ethylenically unsaturated monocarboxylic acid which is acrylic acid, methacrylic acid or mixtures of acrylic acid and methacrylic acid;
(c) the average value of $n$ is in the range of from 0 to 3;
(d) the average values of $a$, $b$ and $c$ are each independently in the range of from 0 to 1;
(e) the average value of $d$ is in the range of from 0 to 1;
(f) the average value of $e$ is in the range of from 0 to 1;
(g) $d + e = 1$;
(h) the average value of $f$ is in the range of from 0 to 1;
(i) the average value of $g$ is in the range of from 0 to 1; and
(j) $f + g = 1$ the improvement comprising adding said diglycidyl ether of bisphenol A and said epihalohydrin to said ethylenically unsaturated monocarboxylic acid while the weight of said reactive solvent in the reaction mixture is at least about 5 percent of the sum of the weights of said resin and said reactive solvent present in said reaction mixture.

2. The method of claim 1 wherein said addition is gradual.

3. The method of claim 1 wherein said diglycidyl ether of bisphenol A and said epihalohydrin are added as separate streams.

4. The method of claim 1 wherein said diglycidyl ether of bisphenol A and said epihalohydrin are concurrently added as separate streams.

5. The method of claim 1 wherein a mixture of said diglycidyl ether of bisphenol A and said epihalohydrin is added to said ethylenically unsaturated monocarboxylic acid.

6. The method of claim 1 wherein said ethylenically unsaturated monocarboxylic acid is acrylic acid and the average values of $a$, $b$ and $c$ each equal zero.

7. The method of claim 1 wherein said ethylenically unsaturated monocarboxylic acid is methacrylic acid and the average values of $a$, $b$ and $c$ each equal one.

8. The method of claim 1 wherein the epihalohydrin is epichlorohydrin, the average value of $d$ is one and the average value of $e$ is zero.

9. The method of claim 1 wherein the average value of $n$ is in the range of from 0 to 1.

10. The method of claim 1 wherein said reaction is conducted at a temperature in the range of from about 50° C. to about 130° C.

11. In the method of preparing a mixture of a resin represented by the formula:

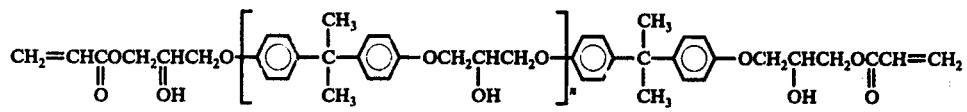

and reactive solvent which is a mixture of 3-chloro-2-hydroxypropyl acrylate and 2-chloro-1-(hydroxymethyl)ethyl acrylate wherein
 (a) said reactive solvent constitutes from about 5 percent to about 95 percent by weight of said mixture of said resin and said reactive solvent;
 (b) diglycidyl ether of bisphenol A represented by the formula:

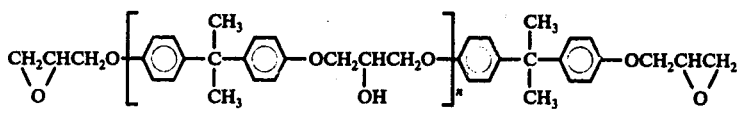

and epichlorohydrin are reacted with acrylic acid; and
 (c) the average value of $n$ is in the range of from 0 to 3, the improvement comprising gradually adding a mixture of said diglycidyl ether of bisphenol A and said epichlorohydrin to said acrylic acid while the weight of said reactive solvent in the reaction mixture is at least about 5 percent of the sum of the weights of said resin and said reactive solvent present in said reaction mixture.

12. The method of claim 11 wherein the average value of $n$ is in the range of from 0 to 1.

13. The method of claim 11 wherein said reaction is conducted at a temperature in the range of from about 50° C. to about 130° C.

14. The method of claim 11 wherein said reaction is conducted at a temperature in the range of from about 80° C. to about 120° C.

15. The method of claim 11 wherein said reaction is conducted at a temperature in the range of from about 100° C. to about 115° C.

* * * * *